United States Patent
Zubrod

(10) Patent No.: US 10,156,355 B2
(45) Date of Patent: Dec. 18, 2018

(54) STEAM TEMPERATURE CONTROL DEVICE FOR A GAS AND STEAM TURBINE PLANT

(71) Applicant: SIEMENS AKTIENGESELLSCHAFT, München (DE)

(72) Inventor: Horst Zubrod, Uttenreuth (DE)

(73) Assignee: SIEMENS AKTIENGESELLSCHAFT (DE)

( * ) Notice: Subject to any disclaimer, the term of this patent is extended or adjusted under 35 U.S.C. 154(b) by 238 days.

(21) Appl. No.: 14/765,571

(22) PCT Filed: Jan. 24, 2014

(86) PCT No.: PCT/EP2014/051408
§ 371 (c)(1),
(2) Date: Aug. 4, 2015

(87) PCT Pub. No.: WO2014/124790
PCT Pub. Date: Aug. 21, 2014

(65) Prior Publication Data
US 2015/0369473 A1    Dec. 24, 2015

(30) Foreign Application Priority Data

Feb. 12, 2013    (DE) .................. 10 2013 202 249

(51) Int. Cl.
*F22D 5/26*    (2006.01)
*F22G 5/12*    (2006.01)
*F01K 23/10*   (2006.01)

(52) U.S. Cl.
CPC ............ *F22G 5/123* (2013.01); *F01K 23/101* (2013.01); *F22G 5/12* (2013.01); *Y02E 20/16* (2013.01)

(58) Field of Classification Search
CPC ........... F22D 5/26; F22B 35/00; F22B 35/104
(Continued)

(56) References Cited

U.S. PATENT DOCUMENTS 3,134,367 A * 5/1964 Halle .................... F22B 35/104
                                                    122/448.4
3,590,788 A * 7/1971 Michel ...................... F22G 5/12
                                                       122/487

(Continued)

FOREIGN PATENT DOCUMENTS

| CN | 1582364 A | 2/2005 |
| DE | 3121442 A1 | 1/1983 |

(Continued)

OTHER PUBLICATIONS

Japanese Office Action dated Jun. 14, 2016; Application No. 2015-556447; 5 pgs.

(Continued)

*Primary Examiner* — Gregory A Wilson
(74) *Attorney, Agent, or Firm* — Schmeiser, Olsen & Watts LLP

(57) ABSTRACT

A steam-temperature control device for a gas- and steam turbine plant, including a feed water line, a feed-water control valve located in the feed water line and a water injection line which branches off from the feed water line upstream of the feed-water control valve in the flow direction of said water and which opens into an injection cooler is provided. The steam-temperature control device is characterized in that a pre-heating device for the injection water is connected in the water injection line. A method for controlling the steam temperature in a gas- and steam turbine plant is also provided.

8 Claims, 3 Drawing Sheets

(58) Field of Classification Search
USPC .... 122/7 R, 406.1, 407, 412, 414, 415, 452, 122/488, 489
See application file for complete search history.

(56) References Cited

U.S. PATENT DOCUMENTS

| | | | | |
|---|---|---|---|---|
| 4,164,848 | A * | 8/1979 | Gilli | F01K 3/14 122/35 |
| 4,445,325 | A * | 5/1984 | Tratz | B01D 1/2846 122/451 S |
| 5,056,468 | A * | 10/1991 | Wittchow | F22B 29/026 122/406.4 |
| 6,311,647 | B1 | 11/2001 | Liebig et al. | |
| 9,518,481 | B2 * | 12/2016 | Bruckner | F22B 35/02 |
| 2003/0196439 | A1 | 10/2003 | Utamura | |
| 2011/0099972 | A1 | 5/2011 | Yang et al. | |
| 2011/0247335 | A1 | 10/2011 | Schmid et al. | |
| 2013/0161009 | A1 * | 6/2013 | Price | E21B 43/2406 166/303 |
| 2014/0000259 | A1 * | 1/2014 | Hermsdorf | F01K 3/24 60/646 |
| 2015/0107537 | A1 * | 4/2015 | Liu | F24D 12/02 122/7 R |

FOREIGN PATENT DOCUMENTS

| | | |
|---|---|---|
| DE | 19944920 A1 | 3/2001 |
| DE | 102010040624 A1 | 3/2012 |
| DE | 102010043683 A1 | 5/2012 |
| EP | 2172622 A2 | 10/2017 |
| JP | S4928701 A | 3/1974 |
| JP | S61256105 A | 11/1986 |
| JP | H05248604 A | 9/1993 |
| JP | H11304108 A | 11/1999 |
| JP | 2010151345 A | 7/2010 |
| WO | WO 2012034870 A2 * | 3/2012 ........... F01K 23/101 |
| WO | WO 2012034876 A2 | 3/2012 |

OTHER PUBLICATIONS

International Search Report; PCT/EP2014/051408; International Filing Date: Jan. 24, 2014; 3 Pgs.
Japanese Office Action dated Feb. 7, 2017; Application No. 2015-556447; 2 pgs.

* cited by examiner

STEAM TEMPERATURE CONTROL DEVICE FOR A GAS AND STEAM TURBINE PLANT

CROSS-REFERENCE TO RELATED APPLICATIONS

This application claims priority to PCT Application No. PCT/EP2014/051408, having a filing date of Jan. 24, 2014, based on DE 10 2013 202 249.2 having a filing date of Feb. 12, 2013, the entire contents of which are hereby incorporated by reference.

FIELD OF TECHNOLOGY

The following relates to a steam temperature control device for a gas and steam turbine plant and concerns the preheating of the injection water. The following further relates to a method for controlling the steam temperature in a gas and steam turbine plant.

BACKGROUND

Modern gas and steam turbine plants are designed for high steam temperatures, which subject the steel-based pipe material currently available to loading up to the permissible limits. Furthermore, these plants additionally demand a considerable degree of operational flexibility, e.g. daily rapid start up, and this leads to additional considerable loading on the pipe material.

In order to ensure that the steam temperature at the outlet of the waste heat steam generators (WHSG) does not exceed the maximum permissible or the procedurally required temperature in all possible operating states, steam temperature control devices are provided in the superheater parts of the waste heat steam generators. These steam temperature control devices operate on the basis of the mixing principle, i.e. cold medium is admixed to the hot medium to be controlled (usually steam).

In the field of power plants, the term "injection cooler" has become established for this type of steam temperature control.

The usual design and arrangement of the injection cooler systems in waste heat steam generators of gas and steam turbine plants leads to a high level of loading on the injection coolers and the following pressure system, which consequently can lead to damage here.

Typical instances of damage are, for example:
cracks in the injection nozzles of the injection coolers
demolition of the injection quill of the coolers
cracks and warpage in the protective shroud of the coolers
cracks in the pipelines
erosion at the injection points in downstream sections This damage can be attributed substantially to two reasons: thermal shock and droplet erosion.

The probability of damage increases greatly with rising steam temperatures and the flexibility of the gas and steam turbine plants which is required by the market.

In the presently common design of the injection system, it is irrelevant whether a drum boiler or a forced-circulation boiler is present. The injection water is withdrawn between a feed water slide and a feed water control valve and conducted to the injection coolers via an injection water line. In order that the injection water does not cool excessively in the case of inactive injection, provision is made of a circulation line, which recirculates the injection water back to the preheater part of the waste heat boiler downstream of the feed water control valve ("injection water recirculation").

The admission pressure required for atomizing the water in the injection cooler is ensured by virtue of the fact that there is a pressure loss between the feed water control valve and the injection point. This pressure difference is also the drive for the heat retention system described with a circulation line.

In the case of this arrangement, there is a very large temperature difference (>300 K) between the injection medium (feed water) and the steam at the injection point. The risk of thermal shocks is increased. In addition, the very cold injection water, compared to the steam, has the effect that the section required for droplet dissolution in the flow of steam downstream of the injection cooler has to be extended to a significantly greater extent in order to counteract the risk of droplet erosion.

A possible improvement in the conditions at and around the injection region can be achieved by virtue of the fact that the injection water is withdrawn at higher temperatures. It is thereby possible for both the risk of thermal shocks and the problem relating to droplet erosion to be improved significantly.

In order that the admission pressure required for the injection water can continue to be maintained, the control valve likewise has to be moved.

Alternatively, the use of a valve referred to as a "pinch valve" is possible, instead of displacing the control valve. In this respect, an additional throttle valve is inserted into the main line (feed water line) of the economizer system (feed water preheating system), in order to provide the admission pressure required for the injection.

Both possibilities have a significant disadvantage, however. The entire pressure part of the waste heat steam generator up to the control valve or pinch valve has to be designed for considerably higher pressures (pump zero delivery head). This results in considerably higher costs caused by the greatly increased use of material and a reinforcement of the supporting structures caused by the considerably higher weights.

SUMMARY

An aspect relates to the apparatus mentioned and the method mentioned such that the causes of thermal shocks and droplet erosion and therefore the occurrence of expensive and complex damage are reduced with low costs.

Since an injection water preheater is connected into the injection water line in a steam temperature control device for a gas and steam turbine plant, having a feed water line, a feed water control valve arranged in the feed water line and an injection water line which branches off from the feed water line upstream of the feed water control valve in the direction of flow of the feed water and issues into an injection cooler, the desired higher injection water temperatures are reached, without having to design the economizer part for the high pressures.

If no injection water is required—this is the case, for example, in the event of full load of the plant—it is advantageous if an injection water recirculation line branches off from the injection water line and issues into the feed water line downstream of a feed water preheating surface arranged in the feed water line in the direction of flow of the feed water. The hot feed water is recirculated back to the feed water system via this recirculation line. This ensures that the injection water is highly preheated upstream of the injection cooler and the temperature differences in relation to the steam are small at the point of control.

Expediently, the injection water preheater is arranged in an exhaust-gas duct of a waste heat steam generator, where it can be designed in such a way that the injection water can be heated to a level close to the boiling temperature by means of a small additional heating surface and finally can be forwarded to the injection coolers, such that a noticeable increase in the temperature of the feed water is possible even given a maximum demand for injection water.

In this case, it is advantageous if the injection water preheater is arranged parallel to the feed water preheating surface, with respect to the direction of flow of an exhaust gas, in a flue gas temperature zone which cannot lead to evaporation even with a stagnating flow. Undesirable evaporation of the injection water is thereby prevented.

The same advantages arise in the inventive method for controlling the steam temperature in a gas and steam turbine plant, according to which injection water is branched off from a feed water line and then preheated and is fed in preheated form to at least one injection cooler.

Advantageously, injection water is preheated in an exchange of heat with exhaust gas in a waste heat steam generator, before it is fed to an injection cooler.

It is furthermore advantageous if the injection water is preheated parallel to the feed water with respect to the direction of flow of an exhaust gas in the waste heat steam generator.

It is furthermore advantageous if recirculated injection water is introduced into the feed water line downstream of a feed water preheating surface in the direction of flow of a feed water.

As a result of the proposed alteration, the temperature difference between the steam temperature at the cooler and the injection water is reduced by >150 K compared to the standard circuit presently available. This leads to a considerable reduction in the risk of thermal shocks.

Since the droplet dissolution downstream of the injection coolers likewise depends greatly on the injection water temperature, the risk of droplet erosion in the pipe parts downstream of the injection coolers is reduced considerably owing to the more rapid droplet dissolution. Since the droplet dissolution takes place over a shorter section, this also has an influence on the design of the corresponding pressure parts.

Since the economizer heating surfaces lying in the main branch do not have to be designed for an elevated pressure, the solution is very beneficial in terms of cost; only the small additional heating surface of the injection water preheater has to be designed for the elevated pressure.

In addition, the necessary fittings of the main feed water branch—the feed water slide and the feed water control valve—and also the design of the economizer systems in respect of pressure can be left analogously to the current standard design. The injection water is likewise withdrawn at the usual point in the system.

BRIEF DESCRIPTION

Some of the embodiments will be described in detail, with reference to the following figures, wherein like designations denote like members, wherein.

DETAILED DESCRIPTION

Figure 1:
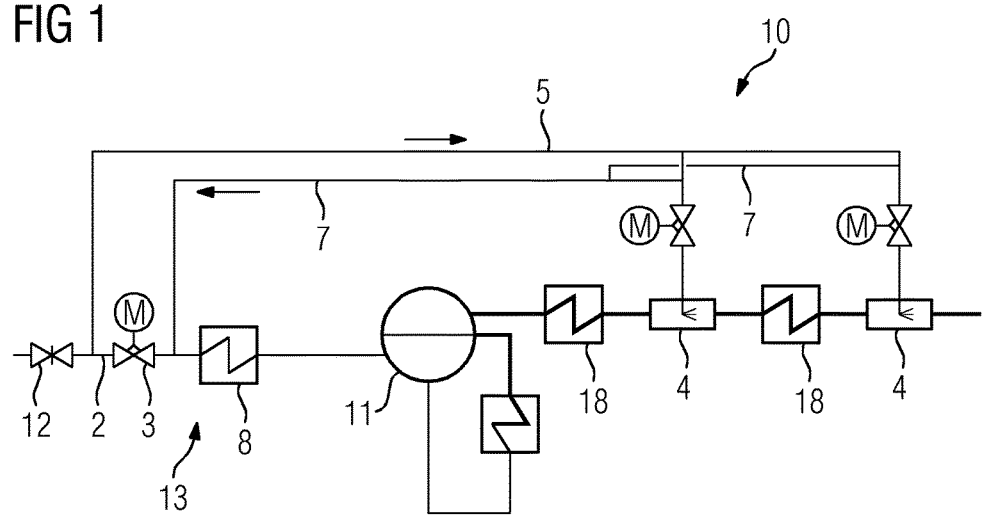
FIG. 1 shows an embodiment of a steam temperature control device with a drum boiler.

FIG. 1 shows, schematically and by way of example, a steam temperature control device 10 according to the prior art without preheating of the injection feed water and with a drum boiler 11.

The injection water is withdrawn between the feed water slide 12 and the feed water control valve 3 of the feed water line 2 and conducted via the injection water line 5 to the injection coolers 4, which are arranged downstream of the superheaters 18 in the direction of flow of steam.

In order that the injection water does not cool excessively in the case of inactive injection, provision is made of a circulation line for the injection water recirculation 7, which recirculates the injection water back to the preheater part 13 of the waste heat steam generator downstream of the feed water control valve 3 and upstream of the feed water preheating surface 8.

The admission pressure required for atomizing the water in the injection cooler 4 is ensured by virtue of the fact that there is a pressure loss between the feed water control valve 3 and the injection point. This pressure difference is also the drive for the aforementioned heat retention system or recirculation system.

Figure 2:
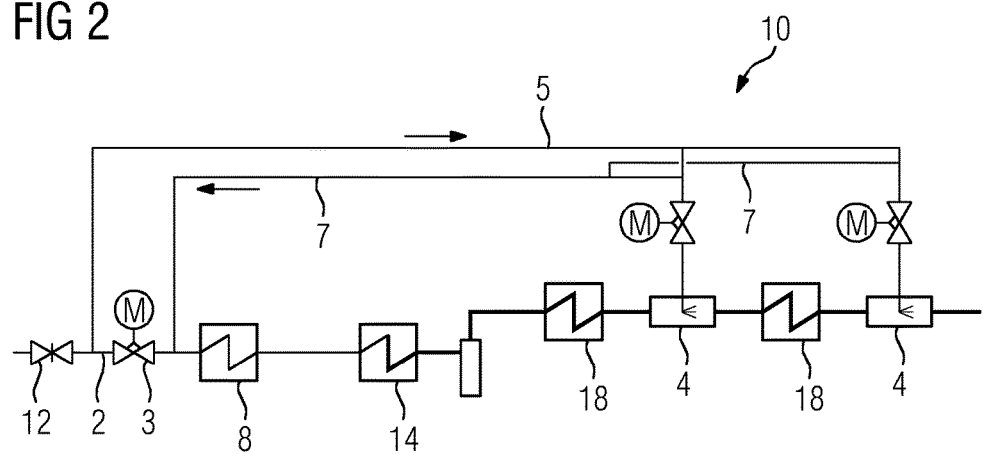
FIG. 2 shows an embodiment of a steam temperature control device with a forced-circulation boiler.

FIG. 2 shows an analogous steam temperature control device 10 according to the prior art without preheating of the injection feed water, in which merely the drum boiler 11 is replaced by a forced-circulation boiler 14. Essentially nothing changes as a result of this, however, for controlling the steam temperature.

An improvement in the temperature conditions at and around the injection region can be achieved by virtue of the fact that the injection water is withdrawn at higher temperatures. It is thereby possible for both the risk of thermal shocks and the problem relating to droplet erosion to be improved significantly.

Figure 3:
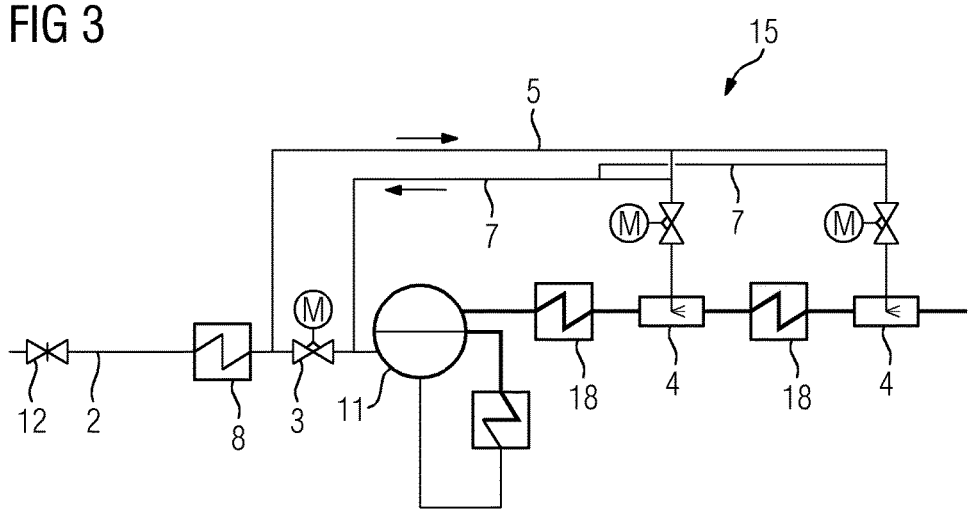
FIG. 3 shows an embodiment of an injection water withdrawal at higher temperatures, with displacement of the feed water control valve.

FIG. 3 shows a typical steam temperature control device 15 according to the prior art with injection water withdrawal at higher temperatures. In order that the admission pressure required for the injection water can continue to be maintained, the control valve 3 likewise has to be moved toward higher temperatures compared to the control devices 10 shown in FIGS. 1 and 2. The injection water recirculation 7 is likewise effected closer to the evaporator 11.

Figure 4:
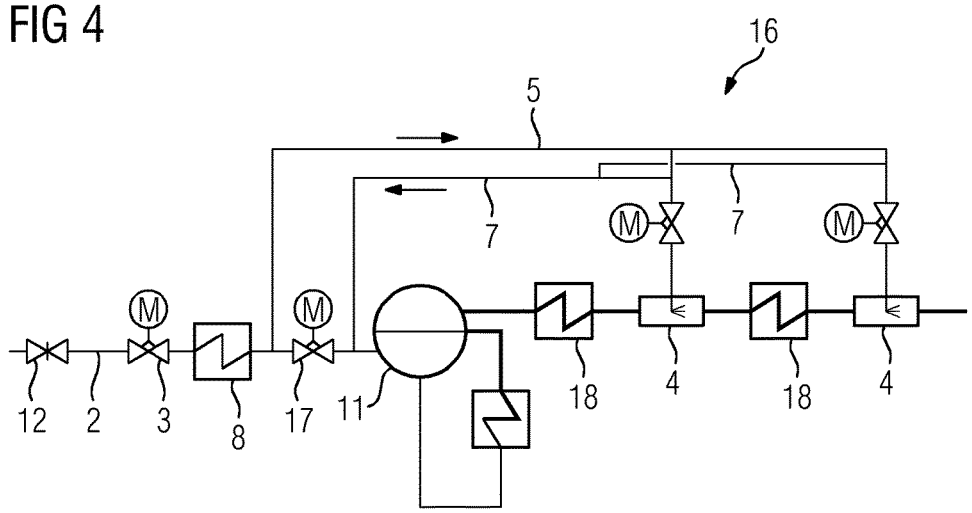
FIG. 4 shows an embodiment of an injection water withdrawal at higher temperatures with an additional "pinch valve"

Alternatively, the use of what is termed a "pinch valve" 17 is possible instead of the displacement of the control valve 3 in the steam temperature control device 16 of FIG. 4.

In this respect, an additional throttle valve 17 is inserted into the main line of the economizer system, i.e. the feed water line 2 for the feed water preheating, in order to provide the admission pressure required for the injection.

As already stated, both of the steam temperature control devices 15 and 16 shown in FIGS. 3 and 4 have a significant disadvantage, however. The entire pressure part of the waste heat boiler up to the control valve 3 or up to the pinch valve 17 has to be designed for considerably higher pressures (pump zero delivery head).

Figure 5:
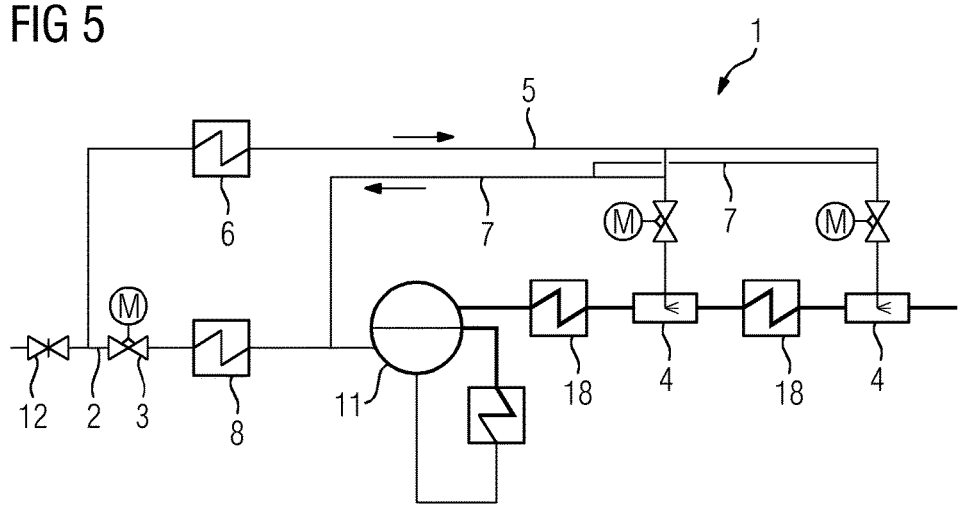
FIG. 5 shows an embodiment of a steam temperature control device.

FIG. 5 shows how a separate injection water preheater 6 is connected into the injection water line 5 in the steam temperature control device 1 according to embodiments of the invention, the injection water preheater 6 being arranged in an exhaust-gas duct 9 (see FIG. 6) of a waste heat steam generator.

As is also the case already in the steam temperature control devices 15 and 16 according to the prior art, the injection water recirculation line 7 branches off from the injection water line 5 and issues into the feed water line 2 downstream of the feed water preheating surface 8 arranged in the feed water line 2 in the direction of flow of the feed water.

Figure 6:
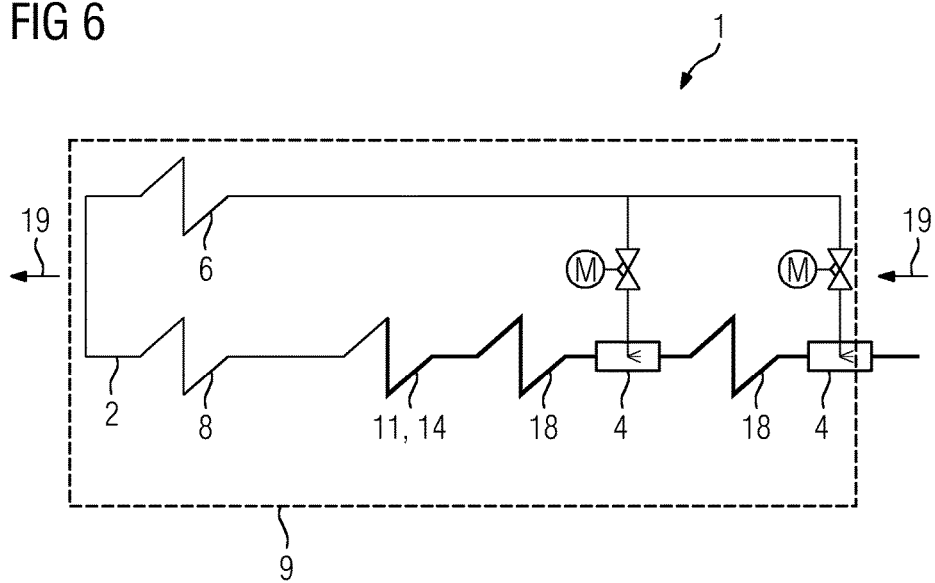
FIG. 6 shows the parallel arrangement of an embodiment of an injection water preheater and feed water preheating surface in the exhaust-gas duct of a waste heat steam generator.

Finally, FIG. 6 shows the substantially parallel arrangement of the injection water preheater 6 and feed water preheating surface 8 in the exhaust-gas duct 9 of a waste heat steam generator, through which the exhaust gas 19 of a gas turbine flows.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A steam temperature control device for a gas and steam turbine plant, comprising:
   a feed water line;
   a feed water control valve arranged in the feed water line; and
   an injection water line that branches off from the feed water line upstream of the feed water control valve in a direction of flow of the feed water and issues into an injection cooler;
   wherein an injection water preheater is connected into the injection water line;
   wherein an injection water recirculation line branches off from the injection water line and issues into the feed water line downstream of a feed water preheating surface arranged in the feed water line in the direction of flow of the feed water.

2. The steam temperature control device as claimed in claim 1, wherein the injection water preheater is arranged in an exhaust-gas duct of a waste heat steam generator.

3. The steam temperature control device as claimed in claim 1, wherein the injection water preheater is arranged parallel to the feed water preheating surface with respect to the direction of flow of an exhaust gas.

4. The steam temperature control device as claimed in claim 1, wherein the injection water preheater is located downstream from a branch off location of the injection water line.

5. A method for controlling the steam temperature in a gas and steam turbine plant, wherein injection water is branched off from a feed water line and then preheated and is fed in preheated form to at least one injection cooler;
   wherein recirculated injection water is introduced into the feed water line downstream of a feed water preheating surface in a direction of flow of a feed water.

6. The method as claimed in claim 5, wherein injection water is preheated in an exchange of heat with exhaust gas in a waste heat steam generator, before it is fed to an injection cooler.

7. The method as claimed in claim 6, wherein the injection water is preheated parallel to the feed water with respect to a direction of flow of an exhaust gas in the waste heat steam generator.

8. A steam temperature control device for a gas and steam turbine plant, comprising:
   a feed water line;
   a feed water control valve arranged in the feed water line; and
   an injection water line that branches off from the feed water line upstream of the feed water control valve in a direction of flow of the feed water and issues into an injection cooler;
   wherein an injection water preheater is connected into the injection water line;
   wherein the injection water preheater is located downstream from a branch off location of the injection water line.

* * * * *